Sept. 19, 1967 S. DEUTSCH 3,342,937

SYNCHRONIZING OF ELECTRON BEAM SCANNING IN A NARROW BANDWIDTH PSEUDO-RANDOM DOT SCAN TELEVISION SYSTEM

Original Filed Aug. 1, 1962 5 Sheets-Sheet 1

INVENTOR.
SID DEUTSCH
BY Gray, Mase & Dunson
ATTORNEYS

INVENTOR.
SID DEUTSCH
BY Gray, Mase & Dunson
ATTORNEYS

INVENTOR.
SID DEUTSCH
BY Gray, Mase & Dunson
ATTORNEYS

INVENTOR.
SID DEUTSCH
BY Gray, Mase & Dunson
ATTORNEYS

INVENTOR.
SID DEUTSCH
BY Gray, Mase & Dunson
ATTORNEYS

United States Patent Office 3,342,937

Patented Sept. 19, 1967

3,342,937

SYNCHRONIZING OF ELECTRON BEAM SCANNING IN A NARROW BANDWIDTH PSEUDO-RANDOM DOT SCAN TELEVISION SYSTEM

Sid Deutsch, Roslyn Heights, N.Y., assignor, by mesne assignments, to The Battelle Development Corporation, Columbus, Ohio, a corporation of Delaware Original application Aug. 1, 1962, Ser. No. 214,102. Divided and this application Dec. 2, 1966, Ser. No. 598,763

4 Claims. (Cl. 178—69.5)

ABSTRACT OF THE DISCLOSURE

A television system is provided wherein each frame comprises several fields made up of equally spaced lines of equally spaced dots (FIG. 2). Successive fields are deflected in a seemingly random manner (FIG. 3) to permit relatively slow scanning without flicker and thus narrow bandwidth in transmission.

A chain of bistable multivibrators (FIG. 4) provide several square waves whose frequencies and amplitudes are related by integral powers of two. These waves are combined additively (FIGS. 11–13) to provide horizontal and vertical pseudo-random deflections.

Horizontal and vertical synchronizations are provided by simplified circuitry. Two synchronized periodic pulses of harmonically related frequencies and equal amplitudes, but different widths, are combined (FIG. 10) in the transmitter. They are separated in the receiver by an opposing periodic pulse of the same frequency, amplitude, and width as the higher frequency sync pulse.

*Cross-reference to related application*

This is a division of application Ser. No. 214,102, filed Aug. 1, 1962, now United States Patent 3,309,461.

*Background*

This invention relates to electron beam scanning and synchronizing thereof. It has to do largely with means for scanning and synchronizing that are especially useful in television cameras and receivers. The scanning, often referred to herein as "pseudo-random" scanning, is by fields of dots, where successive fields are deflected in a seemingly random manner.

Pseudo-random scanning makes possible narrow-band television systems providing pictures of good entertainment value and high usable information content. The bandwidths in such systems may be of the order of only 10 kilocycles per second.

Typical television systems employing the present invention take advantage of the low information content of television pictures, the tolerance of human vision for motion deterioration, and the less-than-optimum resolution of conventional pictures.

There is little motion, relative to the screen, in a typical television picture. The cameraman tries to center a rapidly moving object to prevent its escape to one side of the screen. If the object of interest is a group of people who are talking, only their mouths or arms will be in motion. A swaying type of motion, such as is obtained during a dance performance, is relatively rare.

The eye is extremely sensitive to flicker and finds it annoying. Gradual fades, on the other hand, are accepted. A typical 10-kc. system of this invention uses a 2.667-second frame period. When an object suddenly moves in the picture, it gradually fades from view in its old location, over a 2.667-second interval, while gradually appearing in its new location. The effect is correspondingly less pronounced if the motion is gradual rather than sudden. The eye will tolerate, with little loss in entertainment value, a blurring effect during rapid motion.

A conventional 4-mc. picture contains about 200,000 visible elements (distinct black or white dots). An inexpensive home receiver, with 2-mc. bandwidth and poor interlacing, yields a "good" picture with about 50,000 elements. A typical 10-kc. picture obtainable with the present invention contains approximately 45,000 visible elements.

With a bandwidth of 10 kc., it is possible to transmit live or motion pictures by short wave, record classroom lectures on a conventional tape recorder, use high-quality telephone lines for closed-circuit television, and remove noise in a conventional 4-mc. picture.

The customary scanning motion is one of the worst possible ways in which to cover an area without introducing flicker. The best possible way is to use a random dot scan, that is, to deposit one picture element at a time, but by a beam that hops from place to place in a random manner so that, even if a complete scan requires 2.667 seconds, every region of the picture will be visited several times by the scanning dot during the 2.667-second interval.

A truly random scan is impractical because it cannot be synchronized. The 10-kc. system described herein uses a compromise pseudo-random-type of motion.

*Summary of the invention*

To summarize, the invention includes:

In apparatus for communicating visual information, a transmitter having an electron beam scanning system of successive fields comprising substantially equally spaced lines of substantially equally spaced dots, including apparatus for deflecting successive fields comprising means for providing a plurality of periodic deflections in the direction of the lines and in a direction substantially perpendicular thereto, the frequencies of the deflections being harmonically related, a receiver having an electron beam scanning system of successive fields including apparatus for deflecting successive fields as defined above, and means for synchronizing the fields and the deflections thereof provided in the transmitter and the fields and the deflections thereof provided in the receiver comprising means in the transmitter for providing higher frequency timing pulses and lower frequency timing pulses at harmonically related frequencies, the higher frequency timing pulses being synchronized with, and having a different length of duration than, the lower frequency timing pulses, and being combined therewith such that the combination of the pulses comprises a series of pulses at the higher frequency, all having a first length of duration except those coinciding with the lower frequency timing pulses, the latter pulses having a second length of duration different from the first length, means in the receiver for receiving the combined pulses, synchronizing means responsive to pulses at the higher frequency, means responsive to the combined pulses for providing in synchronization therewith pulses of the first length of duration at the higher frequency, means for combining the last-mentioned pulses in opposition to the combined pulses received from the transmitter, the last-mentioned means thereby providing pulses at the lower frequency in accordance with the pulses provided in the transmitter at the lower frequency, and synchronizing means responsive to the pulses at the lower frequency.

Where *h* successive fields complete a frame, the higher frequency pulses are provided at *h* times the lower frequency, the combination of the pulses comprises a repeating series of *h-l* pluses at the higher frequency having the first length of duration and one pulse having the second length of duration, the synchronizing means responsive to the pulses at the higher frequency controls the beginning of the scan of each field, and the synchronizing means responsive to the pulses at the lower frequency controls the timing of the deflections of said fields.

Apparatus according to the invention for synchronizing a plurality of timing signals in a receiver with similar signals received from a transmitter comprises means of the type as described above for synchronizing the fields and the deflections thereof.

*Description of a preferred embodiment*

Figure 1:
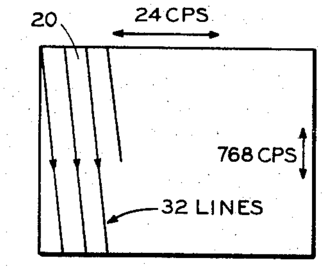
FIG. 1 is a schematic plan view showing a coarse scan usable in developing a pseudo-random scan according to the present invention.
Figure 2:
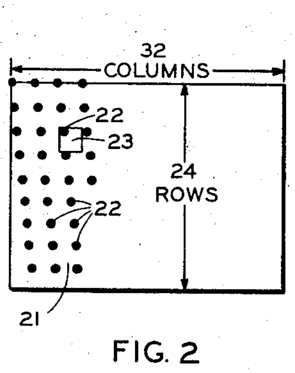
FIG. 2 is a similar view showing a dot scan usable in the development of a pseudo-random scan.
Figure 3:
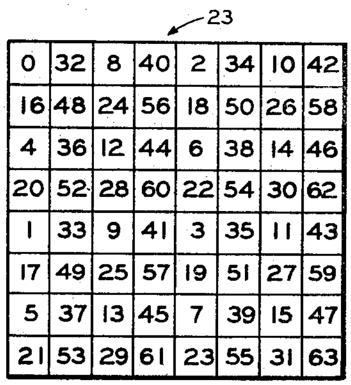
FIG. 3 is an enlarged diagrammatic view of the small square 23 in FIG. 2 illustrating a preferred form of pseudo-random scanning according to this invention by showing the successive picture element locations covered by each dot 22.

Referring now to FIGS 1–3, it is seen that the complete scanning pattern is developed in three steps, as follows:

First, as in FIG. 1, a coarse scan 20 is used in which the picture is scanned vertically at 768 c.p.s. and horizontally at 24 c.p.s. to give 32 lines per field. Vertical scanning is used because less voltage (or current) is required in this direction. Hence, in magnetic deflection, less current need be supplied to the low-inductance yoke coil. The 24-c.p.s. figure is compatible with motion-picture practice. It is the lowest frequency at which large-area flicker is negligible when a long-persistence screen is used.

The 768-c.p.s. vertical sawtooth is modified by a small 18,432-c.p.s. triangle wave to give a stepped wave shape. The resulting raster 21, as indicated in FIG. 2, is a dot pattern with 24 rows of dots 22 per field. The 32 lines of FIG. 1 become 32 columns of dots in FIG. 2. The scanning beam remains stationary for about 25 microseconds in producing each dot.

Finally, square waves are added to the dot pattern to impart the pseudo-random scanning motion. The entire dot array 21 of FIG. 2 is slightly shifted, every 1/24 second, so that each dot 22 covers a new picture-element location. FIG. 3 is a magnified view of the local area 23 covered by the dot 22 in the upper left corner of the small square 23 in FIG. 1. At first, the dot 22 is in position 0 of FIG. 3. One twenty-fourth of a second later, it appears in position 1; the next 1/24 second later, in position 2, etc. The entire process is repeated after the full local scan of 64 picture elements has been accomplished. The frame period is, accordingly, 64/24=2.667 seconds.

FIG. 3 appears to be a random array of 64 numbers. Actually, it is produced with six square waves that are easily generated and synchronized. When the picture is viewed on a long-persistence cathode-ray tube that has 10 percent light output approximately 2.5 seconds after excitation, the pseudo-random local scanning motion is scarcely noticeable despite the full 2.667 seconds needed to completely cover the picture area.

Since each dot 22 of FIG. 2 involves 8 elements in each direction, the transmission contains 192 elements vertically and 256 elements horizontally, a total of 49,152. About 5 percent of these are lost, in each direction, because of retrace time. The transmission rate is $$49{,}152/2.667=18{,}432$$

elements per sec. = the dot frequency. The nominal bandwidth is half this figure because two successive black and white elements approximate a 9,216-c.p.s. sinewave.

Figure 4:
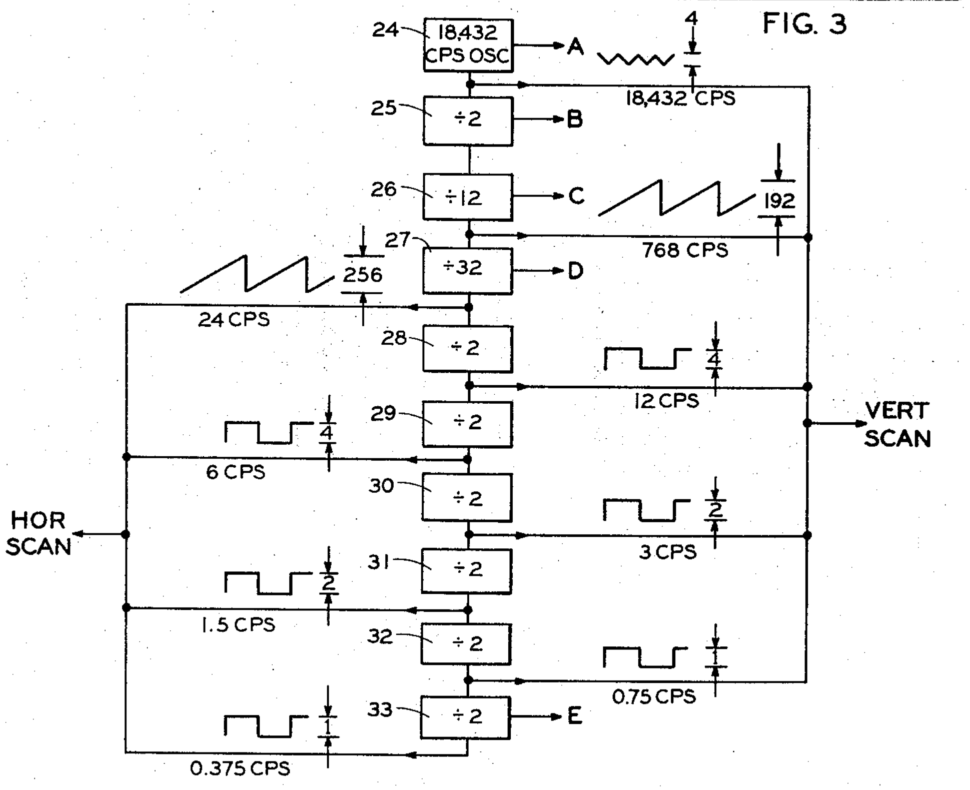
FIG. 4 is a block diagram of a scanning signal generator useful for providing a pseudo-random scan of the type shown in FIG. 3.

A block diagram of the scanning-signal generator is shown in FIG. 4. The peak-to-peak amplitude of each signal is given in picture-element units. Starting with the 18,432-c.p.s. oscillator 24, bistable multivibrators 25–33 divide down to 0.375 c.p.s. The pseudo-random scan square waves are produced by the block of six bistable multis 28–33 at the lower end of the diagram.

*Synchronizing system*

Figure 5:
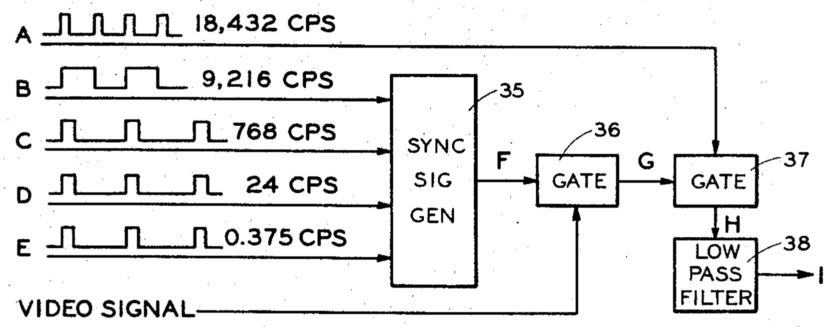
FIG. 5 is a block diagram of a typical synchronizing signal generator and shaping circuits useful in a television system according to the present invention.
Figure 6:
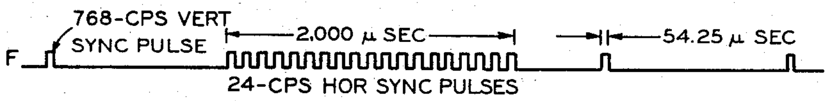
FIG. 6 is a diagrammatic view showing the wave form at F in FIG. 5.

As in conventional television practice, synchronizing signals are added to the video signal. The 10-kc. system sync signals are simpler than those of conventional broadcasts in that equalizing pulses are unnecessary, but more complicated in that dot and square-wave sync signals must be added. A block diagram of the sync signal generator 35 and subsequent shaping circuits, comprising gates 36, 37 and a low-pass filter 38, is shown in FIG. 5. The sync signal wave shape F is shown in FIG. 6.

Figure 9:
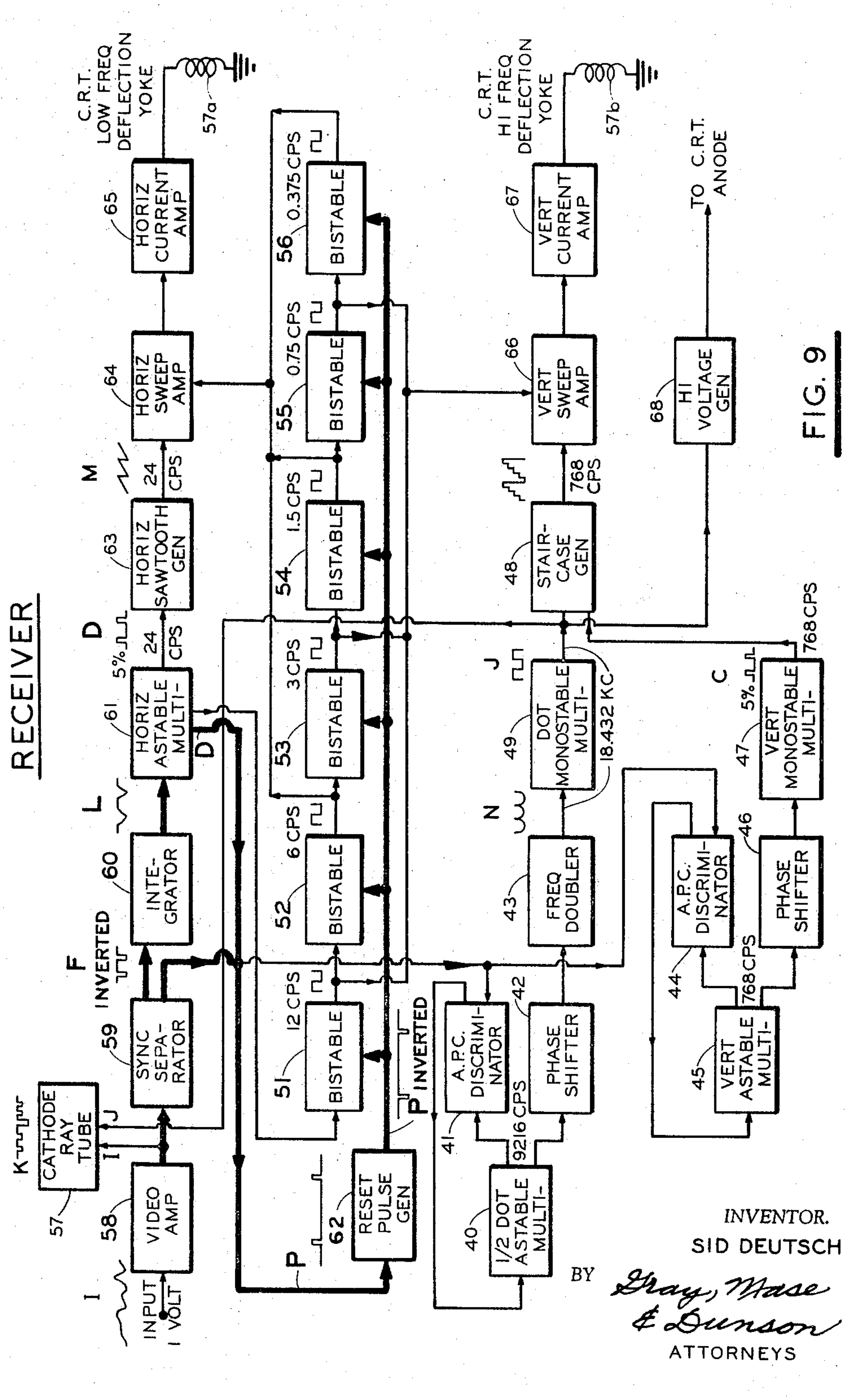
FIG. 9 is a block diagram of a typical video section of a television receiver embodying the present invention.

Vertical and horizontal sync pulses are modulated by a 9,216-c.p.s. square wave; this synchronizes a 9,216-c.p.s. oscillator 40 in the receiver (FIG. 9) by a conventional automatic phase control circuit 41. The 18,432-c.p.s. dot triangle is then derived by frequency-doubling the oscillator output through a phase shifter 42 and a frequency doubler 43.

A second automatic phase control circuit 44 synchronizes a 768-c.p.s. oscillator 45 in the receiver to the incoming vertical sync pulses in order to generate the vertical sawtooth. The 768-c.p.s. output of the vertical astable multivibrator 45 is fed through a phase shifter 46 to a vertical monostable multivibrator 47, which provides a 5 percent 768-c.p.s. rectangular wave (wave form C) to a staircase generator 48, which receives also a 18.432-kc. square wave (wave form J) from a dot monostable multivibrator 49, actuated by the 18.432-kc. output (wave form N) of the frequency doubler 43.

The 24-c.p.s. horizontal sawtooth sync signal is derived, as in conventional practice, by integrating the horizontal sync pulse.

The six bistable multis 51–56 in the receiver are synchronized with those of the transmitter by reducing, to half its usual width, one out of every 64 horizontal sync pulses. When all of the six bistables 28–33 of FIG. 4 are in the zero state (first tube off, second tube on), a 1,000-$\mu$sec. horizontal sync pulse is substituted for the usual 2,000-$\mu$sec. pulse. In the receiver, the 1,000-$\mu$sec. pulse generates a reset pulse that places all of the receiver bistables into the zero state.

Figure 7:
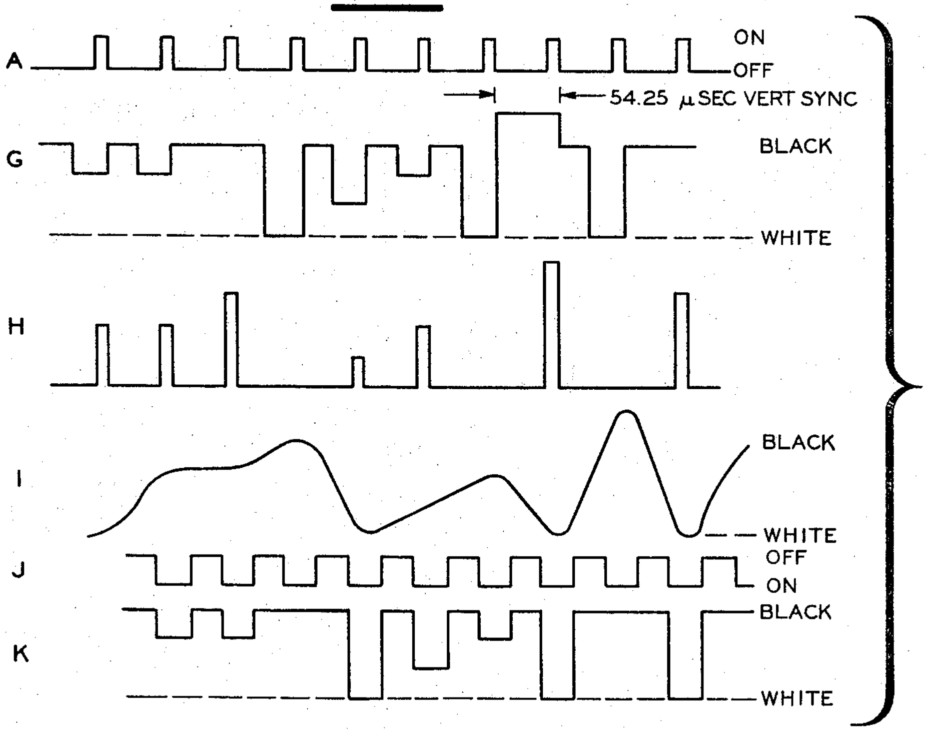
FIG. 7 is a diagrammatic view showing the wave forms at A, G, H, and I in FIG. 5 and the modulating wave form J provided in the receiver to reproduce the original brightness levels, wave form K, therein.

To minimize bandwith requirements, the composite video-plus-sync signal (wave form G in FIG. 7) is sampled by narrow 18,432-c.p.s. pulses A, producing the wave form H in FIG. 7; and then is passed through the 10-kc. low-pass filter 38 before it reaches the transmitter output terminals (wave form I in FIG. 7).

In the receiver, the cathode of the picture tube 57 is modulated by an 18,432-c.p.s. square wave (wave form J from the dot monostable multivibrator 49) to yield the original brightness levels (wave form K). Wave form J is derived from the 9,216-c.p.s. locally generated signal, as described above, which, in turn, is synchronized to the transmitter vertical sync pulse information carried in the peak amplitude of wave form I.

A video amplifier 58 receives the video input (wave form I) and feeds it, amplified and inverted, to the cathode ray picture tube 57 and to a synchronizing pulse separator 59, which provides the synchronizing signal (wave form F inverted) to the automatic phase control discriminators 41, 44 and to an integrator 60. The output of the integrator 60 (wave form L) is fed to a horizontal astable multivibrator 61, which provides a 5 percent 24-c.p.s. rectangular wave (wave form D) to the bistable multivibrator 51, a reset pulse generator 62, and a horizontal sawtooth generator 63. The generator 63 feeds a 24-c.p.s. sawtooth wave (wave form M) to a horizontal sweep amplifier 64, which is connected through a horizontal current amplifier 65 to the low-frequency deflection yoke **57*a* of the cathode ray tube 57**.

The output of the reset pulse generator 62 is connected to each of the bistable multivibrators 51–56, keeping them synchronized with the transmitter bistable multivibrators 28–33.

The outputs of the bistable multivibrators 52, 54, and 56, are connected to the horizontal sweep amplifier 64, providing the 6-c.p.s., 1.5-c.p.s., and 0.375-c.p.s. square waves corresponding to those in the transmitter and providing the horizontal components of the pseudo-random scan. The outputs of the bistable multivibrators 51, 53, and 55 are connected to a vertical sweep amplifier 66, which is connected through a vertical current amplifier 67 to the high-frequency deflection yoke **57*b* of the cathode ray tube 57. The bistables 51, 53, and 55** thus provide the 12-c.p.s., 3-c.p.s., and 0.75-c.p.s. square waves corresponding to those in the transmitter and providing the vertical components of the pseudo-random scan.

A high-voltage generator 68 supplies the proper voltage to the anode of the cathode ray tube 57. All of the circuits represented by blocks in the drawings are known, and can be at least mainly conventional, where desired, as to any details not mentioned herein.

The video signal is A-C coupled with an effective time constant of 20/768, or 0.026 second. This results in a small droop (less than 5 percent) between vertical sync pulses. Wherever necessary, D-C components are restored by clamping against the vertical sync pulse tips.

*Pseudo-random scanning*

An important feature of the invention is that a pseudo-random scan is achieved with square waves that can be derived from a chain of bistable multivibrators in which only the first multivibrator need be triggered by an external constant-frequency source.

A pseudo-random scan is one in which the dots *seem* to occupy unrelated positions. A square wave is a voltage (or current) that alternates between two levels, with equal time spent in each level. Because the wave moves up exactly the same distance that it moves down and spends equal time at each location, there is no drift illusion regardless of the complexity of the scan.

A bistable multivibrator is an electronic circuit that has two stable states that correspond to the two levels mentioned above. The multivibrator goes from one stable state to the other when a (negative) trigger pulse is applied. In a chain of multivibrators, each stage supplies the trigger pulse for the next stage, so that each multivibrator divides by two in frequency. The bistable multivibrator is a basic element of digital computers. It is a simple, reliable device.

Figure 8:
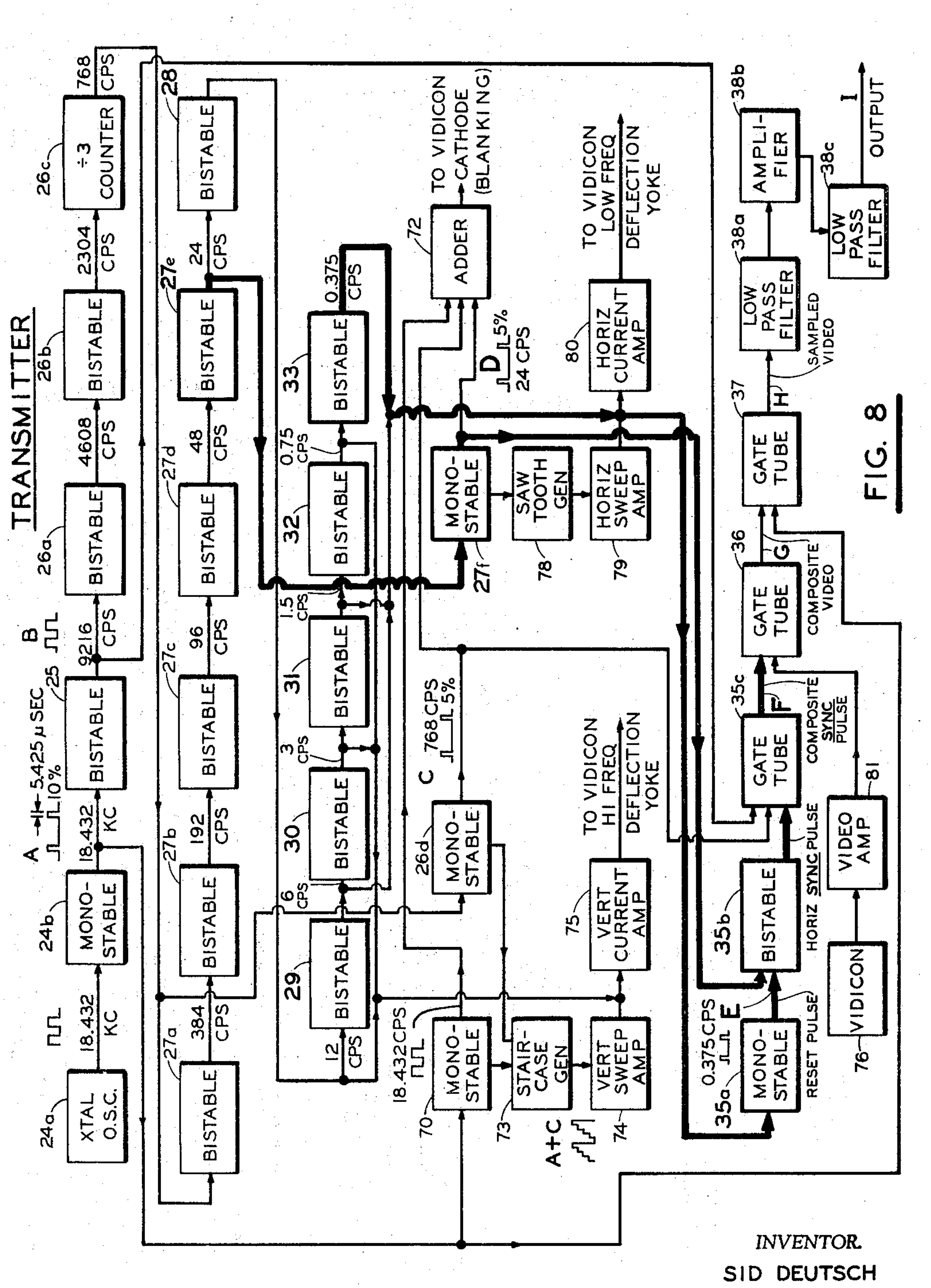
FIG. 8 is a block diagram of a typical video section of a television transmitter embodying this invention.

FIG. 8 shows in block diagram form a typical video section of a television transmitter embodying the present invention. Some of the blocks in FIGS. 4 and 5, which are simplified for clarity in explaining the invention, correspond to a plurality of blocks in FIG. 8, which shows in more detail the components employed in a working embodiment of the invention. The oscillator 24 of FIG. 4 is shown in FIG. 8 as a crystal oscillator **24*a* feeding an 18.432-kc. wave, approximately square, to a monostable multivibrator 24*b*** which provides the 10 percent rectangular wave (wave form A). Subscripts are used similarly in other parts of FIG. 8 and the description thereof where corresponding blocks in FIG. 4 are broken down into a plurality of components.

Connected successively after the monostable multivibrator **24*b* are a bistable multivibrator 25, bistable multivibrators 26*a*, 26*b*, divide-by-three counter 26*c*, and bistable multivibrators 27*a*, 27*b*, 27*c*, 27*d*, 27*e*, 28, 29, 30, 31, 32, and 33, providing square wave outputs of 9216, 4608, 2304, 768, 384, 192, 96, 48, 24, 12, 6, 3, 1.5, 0.75, and 0.375 c.p.s., respectively. The 18.432-kc. output (wave form A) of the monostable multivibrator 24*b* is connected also to a monostable multivibrator 70 and to the gate tube 37. The 9216-c.p.s. square wave output (wave form B) of the bistable multivibrator 25 is connected also to a gate tube 35*c*. The 768–c.p.s. output of the divide-by-three counter 26*c* is connected also to a monostable multivibrator 26*d*, which provides the 5 percent rectangular wave (wave form C) to the gate tube 35*c*, to an adder 72, and to staircase generator 73. The monostable multivibrator 70 provides an 18.432-kc. square wave output to the adder 72 and to the staircase generator 73. The staircase generator 73 provides a staircase-shaped wave (wave form $A+C$) to a vertical sweep amplifier 74, the output of which is connected to a vertical current amplifier 75, the output of which is fed to the high frequency diflection yoke of a vidicon camera tube 76**.

The 24-c.p.s. square wave output of the bistable multibrator **27*e* is connected to a monostable multivibrator 24*f*, the output of which, a 5 percent 24-c.p.s. rectangular wave (wave form D), is connected to the adder 72, to a bistable multivibrator 35*b*, and to a sawtooth generator 78. The output of the sawtooth generator 78 is fed to a horizontal sweep amplifier 79, the output of which is connected to a horizontal current amplifier 80. The output of the horizontal current amplifier 80 is connected to the low-frequency deflection yoke of the camera tube 76**.

The output of the adder 72 is connected to the cathode of the camera tube 76, providing the necessary blanking signals.

The outputs of the bistable multivibrators 28, 30, and 32 are connected to the vertical current amplifier 75. providing the 12-c.p.s., 3-c.p.s., and 0.75-c.p.s. vertical components of the pseudo-random scan. The output of the bistable multivibrators 29, 31, and 33 are connected to the horizontal current amplifier 80, providing the 6-c.p.s., 1.5-c.p.s., and 0.375-c.p.s. square wave horizontal components of the pseudo-random scan.

The 0.375-c.p.s. square wave output of the bistable multivibrator 33 is connected also to a monostable multivibrator 35*a*, the output of which· a 0.375-c.p.s. rectangular wave (wave form E), comprises a reset pulse which is fed to the bistable multivibrator 35*b*. The output of the bistable multivibrator 35*b* comprises a horizontal synchronizing pulse which is fed to the gate tube 35*c*. The output of the gate tube 35*c* is the composite synchronizing pulse (wave form F), which is fed to the gate tube 36. The output of the camera tube 76 is fed to a video amplifier 81, the output of which is also connected to the gate tube 36. The gate tube 36 provides the composite video output (wave form G) to the gate tube 37, which provides the sampled video output (wave form H) through a low-pass filter 38*a*, an amplifier 38*b*, and a low-pass filter 38*c*, providing the output (wave form I) that comprises the video modulation for the transmitter (waveforms G, H, and I are shown in FIG. 7).

*Synchronizing system—Operation*

Figure 10:
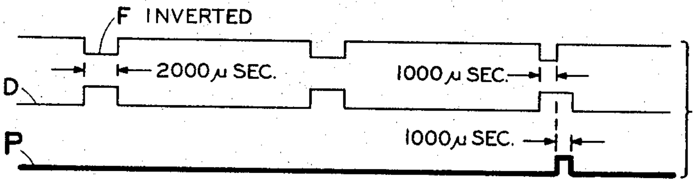
FIG. 10 is a diagrammatic view showing wave forms used in synchronizing the pseudo-random scan in the receiver with that in the transmitter.

FIGURE 10 helps to explain the synchronizing of the bistable multivibrators 51–56 in the receiver with the corresponding bistable multivibrators 28–33 in the transmitter. In the transmitter, the bistable multivibrator 33 feeds a 0.375-c.p.s. square wave to the monostable multivibrator 35*a*, which provides an output of the same frequency but comprising rectangular pulses (wave form E) only 1000 microseconds in duration. These pulses are fed to the bistable multivibrator 35*b* which also receives the 24-c.p.s. 2000-microsecond pulses (wave form D) from the monostable multivibrator 27*f* actuated by the 24-c.p.s. square wave from the bistable multivibrator 27*e*. The inputs to the bistable multivibrator 35*b* are connected so that every 64th pulse of the wave form D is replaced by the pulse of the wave form E, which is only half as long in duration, namely 1000 microseconds.

In the receiver, the synchronizing pulse separator 59, receiving the output of the video amplifier 58, supplies the composite synchronizing pulse F· inverted, to the reset pulse generator 62 and to the integrator 60. The integrator 60 provides 24-c.p.s. pulses (wave form L) to the horizontal astable multivibrator 61 which provides an output identical to the wave D of the transmitter. This wave form D is also connected to the reset pulse generator 62. From FIG. 10, it is apparent that the sum of the two waves F inverted and D is the 1000-microsecond pulse (wave form P) that is provided at every 64th pulse of the wave D in accordance with the pulse E from the monostable multivibrator 35*a* of the transmitter. The reset pulse generator 62 inverts its input pulse P and supplies the reset pulse P inverted to each of the bistable multivibrators 51–56, thus placing all of them in the zero state simultaneously at the beginning of each frame (every 64th field).

*Pseudo-random scanning—Operation*

Figure 11:
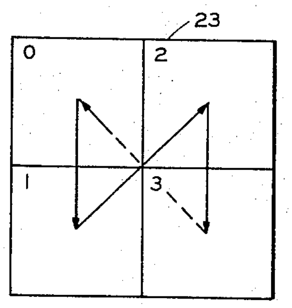
FIGS. 11–13 are diagrammatic views illustrating the way in which the pseudo-random scanning sequence of FIG 3 may be obtained.
Figure 12:
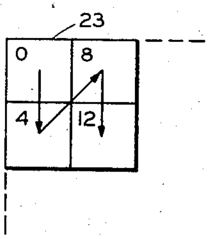
Figure 13:
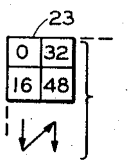

FIGS. 11–13 help to explain the way in which the six square waves used to provide the pseudo-random scanning cause the successive fields of dots to be deflected in the sequence shown in FIG. 3. Referring also to FIG. 4, the vertical deflections of four deflection units, as shown by the arrows in FIG. 11, are provided by the 12-c.p.s. four deflection unit square wave output of the bistable multivibrator 28. Thus, successive fields occupy alternately the top and bottom halves of the square 23. Every second field is deflected horizontally by the 6-c.p.s. four deflection unit square wave output of the bistable multivibrator 29. Thus, two successive fields occupy a position in the left side of the square 23, one in the top half and one in the bottom half; the next two fields occupy positions in the right side of the square 23, one in the top half and one in the bottom half; and so on, alternately. The combined effect is to deflect each successive field to a different quadrant of the square 23, upper left, lower left, upper right, lower right, upper left, etc., as illustrated by the arrows in FIG. 11 the first four dot positions being indicated by the numerals 0, 1, 2, 3 in the first four positions of the scanning sequence of FIG. 3.

Similarly, FIG. 12 illustrates the way in which the 3-c.p.s. two deflection unit vertical deflection provided by the bistable multivibrator 30 and the 1.5-c.p.s. two deflection unit horizontal deflection provided by the bistable multivibrator 31 cause every fourth field to be deflected to a different subquadrant of each quadrant of the square 23. The description is the same as the above description in connection with FIG. 11, except that the deflections are only half as big as those of FIG. 11 and they take place at only one-fourth the rate of the corresponding deflections illustrated in FIG. 11. In like manner, FIG. 13 illustrates the way in which the 0.75-c.p.s. one deflection unit square wave provided by the bistable multivibrator 32 and the 0.375-c.p.s. one deflection unit square wave provided by the bistable multivibrator 33 cause every sixteenth field to be deflected to a different subsubquadrant of the square 23. The combined effect of all of the deflections illustrated in FIGS. 11–13 through a complete frame of 64 fields is to provide the pseudo-random scanning sequence shown in FIG. 3.

Figure 14:
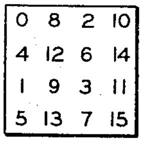
FIG. 14 is a diagrammatic view similar to FIG. 3 showing another typical pseudo-random scanning sequence.

FIG. 14 shows the pseudo-random scanning sequence that is provided when the deflections of FIG. 13 are omitted and the deflections of FIGS. 11 and 12 are cut in half. This scanning sequence is used in a modification of the 10 kc. narrow-band television system described above. The modified system occupies a nominal bandwidth of 40 kc., the ideal bandwith being 36.864 kc. Referring to FIGS. 1–4, the number of picture elements or dots in the modified system is the same as in the 10-kc. system, but each fiild comprises 64 columns and 48 rows, the vertical and horizontal spacing between adjacent dots being only four deflection units. A complete frame thus comprises 16 fields. The oscillator 24 provides a signal of 73.728 kc., the frequency dividers 26 divide by 24, and the vertical scanning frequency is 1536 c.p.s. The freqency dividers 27 divide by 64. The 12-c.p.s. square wave provided by the bistable multivibrator 28 and the 6-c.p.s. square wave provided by the bistable multivibrator 29 have amplitudes of two deflection units each, while the 3-c.p.s. square wave output of the bistable multivibrator 30 and the 1.5-c.p.s. square wave output of the bistable multivibrator 31 have amplitudes of one deflection unit each. The bistable multivibrators 32 and 33 are omitted. A complete frame of 16 fields is provided every 0.667 second, as compared to a complete frame of 64 fields every 2.667 seconds in the 10-kc. system. Thus, the 40-kc. system provides better pictures on a short-persistence screen than does the 10-kc. system.

Figure 15:
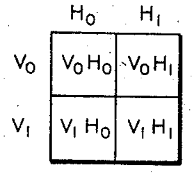
FIGS. 15–21 are diagrammatic views illustrating ways in which other scanning sequences can conveniently be provided.
Figures 16, 17, 18, 19:
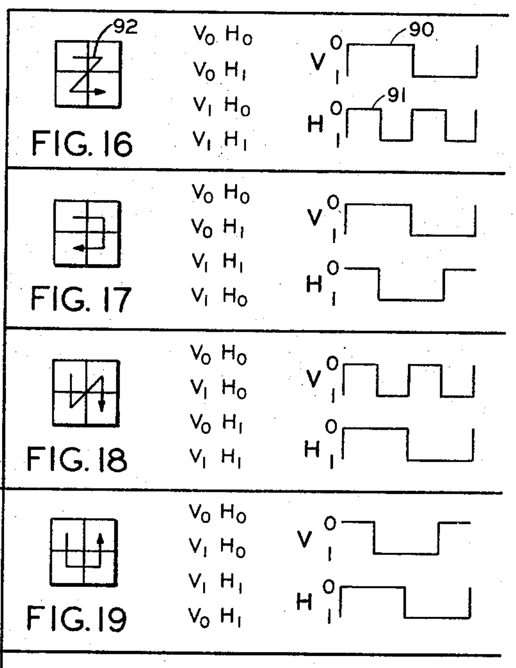
Figures 20, 21:
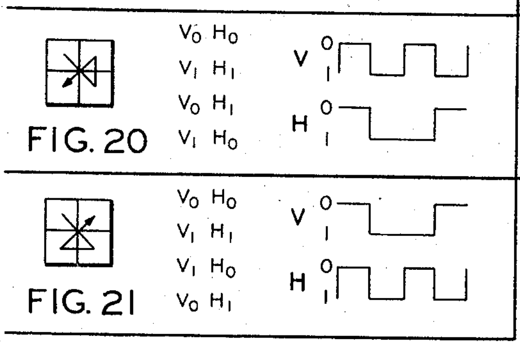

FIGS. 15–21 illustrate ways in which each of the six different sequences of quadrants, subquadrants, or subsubquadrants of FIGS. 11–13 can conveniently be provided. For convenience, the squares in FIGS. 15–21 will be considered to be smallest subordinate quadrants, two deflection units on a side. FIG. 15 defines each unit deflection area by the amplitude in deflection units of the deflection required to deflect the electron beam to that unit deflection area. The symbol $V_0H_0$ means zero vertical deflection and zero horizontal deflection, $V_0H_1$ means zero vertical deflection and one unit of horizontal deflection, etc. From FIG. 16, it is apparent that the square wave 90 for vertical deflection and the square wave 91, at twice the frequency and in the phase relationship shown in FIG. 16, together provide the deflection sequence $V_0H_0$, $V_0H_1$, $V_1H_0$, $V_1H_1$, illustrated by the Z-shaped line 92. Similarly, the vertical and horizontal deflecting square waves of FIGS. 17–21 provide the respective sequences of deflection listed and illustrated therein. FIG. 18, of course, shows the same sequence that is illustrated in FIGS. 11–13. The sequences of FIGS. 16, 18, 20, and 21 can be provided by two bistable multivibrators, the first triggering the second. FIG. 18 is the same as FIG. 16, with the vertical and horizontal connections interchanged. FIG. 20 is the same as FIG. 21, with the vertical and horizontal connections interchanged. FIG. 20 is similar to FIG. 18, but with the second bistable multivibrator triggered by the reverse output of the first bistable multivibrator as compared with FIG. 18. FIG. 21 is similar to FIG. 16 in the same manner.

Narrow bandwidth pseudo-random scanning according to the present invention provides a striking improvement over conventional wide bandwidth scanning by substantially removing electrical noise or "snow" from the picture. Even where the noise-to-signal ratio is high enough to produce an unsatisfactory picture in a conventional television receiver, the noise averages out during the scanning of a complete frame in the narrow bandwidth pseudo-random scanning system, providing a picture that is substantially free of snow. This has been demonstrated by detuning the antenna of an ordinary television broadcast receiver until the input to the receiver was so weak that the picture was virtually covered by snow and nearly undiscernible to the eye. The vidicon camera tube of the transmitter was aimed at the screen of the conventional receiver to supply the video input to the transmitter of FIG. 8. The signal from the transmitter of FIG. 8 was received by the receiver of FIG. 9, and the picture received was clear and substantially free from any noise or snow. Thus, it is apparent that the narrow bandwidth pseudo-random scanning system of the present invention makes possible the satisfactory transmission and reception of video signals under extreme conditions of weak signals and high noise.

While the forms of the invention herein disclosed constitute preferred embodiments, it is not intended to describe or mention all of the possible equivalent forms or ramifications of the invention. It will be understood that the words used are terms of description rather than of limitation, and that various changes may be made without departing from the spirit or scope of the invention.

What is claimed is:

1. In apparatus for communicating visual information, a transmitter having an electron beam scanning system of successive fields comprising substantially equally spaced lines of substantially equally spaced dots, including apparatus for deflecting successive fields comprising means for providing a plurality of periodic deflections in the direction of said lines and in a direction substantially perpendicular thereto, the frequencies of said deflections being harmonically related, a receiver having an electron beam scanning system of successive fields including apparatus for deflecting successive fields as defined above, and means for synchronizing the fields and the deflections thereof provided in the transmitter and the fields and the deflections thereof provided in the receiver comprising means in the transmitter for providing higher frequency timing pulses and lower frequency timing pulses at harmonically related frequencies, said higher frequency timing pulses being synchronized with and having a different length of duration than, said lower frequency timing pulses, and being combined therewith such that the combination of said pulses comprises a series of pulses at said higher frequency, all having a first length of duration except those coinciding with said lower frequency timing pulses, said latter pulses having a second length of duration different from said first length, means in the receiver for receiving said combined pulses, synchronizing means responsive to pulses at said higher frequency, means responsive to said combined pulses for providing in synchronization therewith pulses of said first length of duration at said higher frequency, means for combining said last-mentioned pulses in opposition to said combined pulses received from the transmitter, said last-mentioned means thereby providing pulses at said lower frequency in accordance with the pulses provided in the transmitter at said lower frequency, and synchronizing means responsive to said pulses at said lower frequency.

2. In apparatus for communicating visual information, a transmitter having an electron beam scanning system of successive fields comprising substantially equally spaced lines of substantially equally spaced dots, $h$ successive fields completing a frame, including apparatus for deflecting successive fields comprising means for providing a plurality of periodic deflections in the direction of said lines and in a direction substantially perependicular thereto, the frequencies of said deflections being harmonically related, a receiver having an electron beam scanning system of successive fields including apparatus for deflecting successive fields as defined above, and means for synchronizing the fields and the deflections thereof provided in the transmitter and the fields and the deflections thereof provided in the receiver comprising means in the transmitter for providing lower frequency timing pulses and higher frequency timing pulses at $h$ times the lower frequency, said higher frequency timing pulses being synchronized with, and having a different length of duration than, said lower frequency timing pulses, and being combined therewith such that the combination of said pulses comprises a repeating series of $h$-$l$ pulses at said higher frequency having a first length of duration and one pulse having a second length of duration different from said first length, means in the receiver for receiving said combined pulses, synchronizing means responsive to pulses at said higher frequency for controlling the beginning of the scan of each field, means responsive to said combined pulses for providing in synchronization therewith pulses of said first length of duration at said higher frequency, means for combining said last-mentioned pulses in opposition to said combined pulses received from the transmitter, said last-mentioned means thereby providing pulses at said lower frequency in accordance with the pulses provided in the transmitter at said lower frequency, and synchronizing means responsive to said pulses at said lower frequency for controlling the timing of the deflections of said fields.

3. Apparatus for synchronizing a plurality of timing signals in a receiver with similar signals received from a transmitter comprising means in the transmitter for providing higher frequency timing pulses and lower frequency timing pulses at harmonically related frequencies, said higher frequency timing pulses being synchronized with, and having a different length of duration than, said lower frequency timing pulses, and being combined therewith such that the combination of said pulses comprises a series of pulses at said higher frequency, all having a first length of duration except those coinciding with said lower frequency timing pulses, said latter pulses having a second length of duration different from said first length, means in the receiver for receiving said combined pulses, synchronizing means responsive to pulses at said higher frequency, means responsive to said combined pulses for providing in synchronization therewith pulses of said first length of duration at said higher frequency, means for combining said last-mentioned pulses in opposition to said combined pulses received from the transmitter, said last-mentioned means thereby providing pulses at said lower frequency in accordance with the pulses provided in the transmitter at said lower frequency, and synchronizing means responsive to said pulses at said lower frequency.

4. Apparatus for synchronizing a plurality of timing signals in a receiver with similar signals received from a transmitter comprising means in the transmitter for providing lower frequency timing pulses and higher frequency timing pulses at $h$ times the lower frequency, said higher frequency timing pulses being synchronized with, and having a different length of duration than, said lower frequency timing pulses, and being combined therewith such that the combination of said pulses comprises a repeating series of $h$-$l$ pulses at said higher frequency having a first length of duration and one pulse having a second length of duration different from said first length, means in the receiver for receiving said combined pulses, synchronizing means responsive to pulses at said higher frequency, means responsive to said combined pulses for providing in synchronization therewith pulses of said first length of duration at said higher frequency, means for combining said last-mentioned pulses in opposition to said combined pulses received from the transmitter, said last-mentioned means thereby providing pulses at said lower frequency in accordance with the pulses provided in the transmitter at said lower frequency, and synchronizing means responsive to said pulses at said lower frequency.

References Cited

UNITED STATES PATENTS

| | | | |
|---|---|---|---|
| 2,472,774 | 6/1949 | Mayle | 178—7.7 |
| 2,798,114 | 7/1957 | Schlesinger | 178—5.4 |
| 2,823,258 | 2/1958 | Schlesinger et al. | 178—7.5 |
| 2,853,550 | 9/1958 | Reid | 178—69.5 XR |
| 2,940,005 | 6/1960 | Toulon | 178—7.7 XR |

JOHN W. CALDWELL, *Acting Primary Examiner.*

R. L. RICHARDSON, *Assistant Examiner.*